Figure 1:
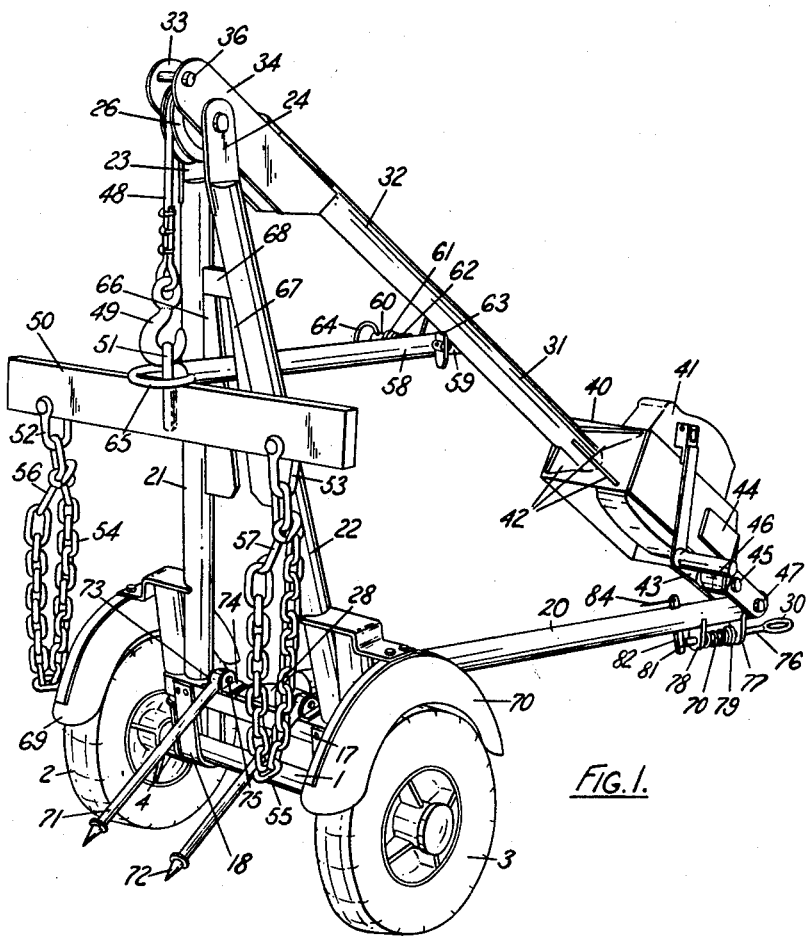

March 31, 1964 L. C. NEWMAN 3,127,037
APPARATUS FOR TOWING ROAD VEHICLES
Filed Dec. 13, 1961 3 Sheets-Sheet 1

Inventor
Leslie C. Newman
By
Watson, Cole, Grindle & Watson
Attorneys

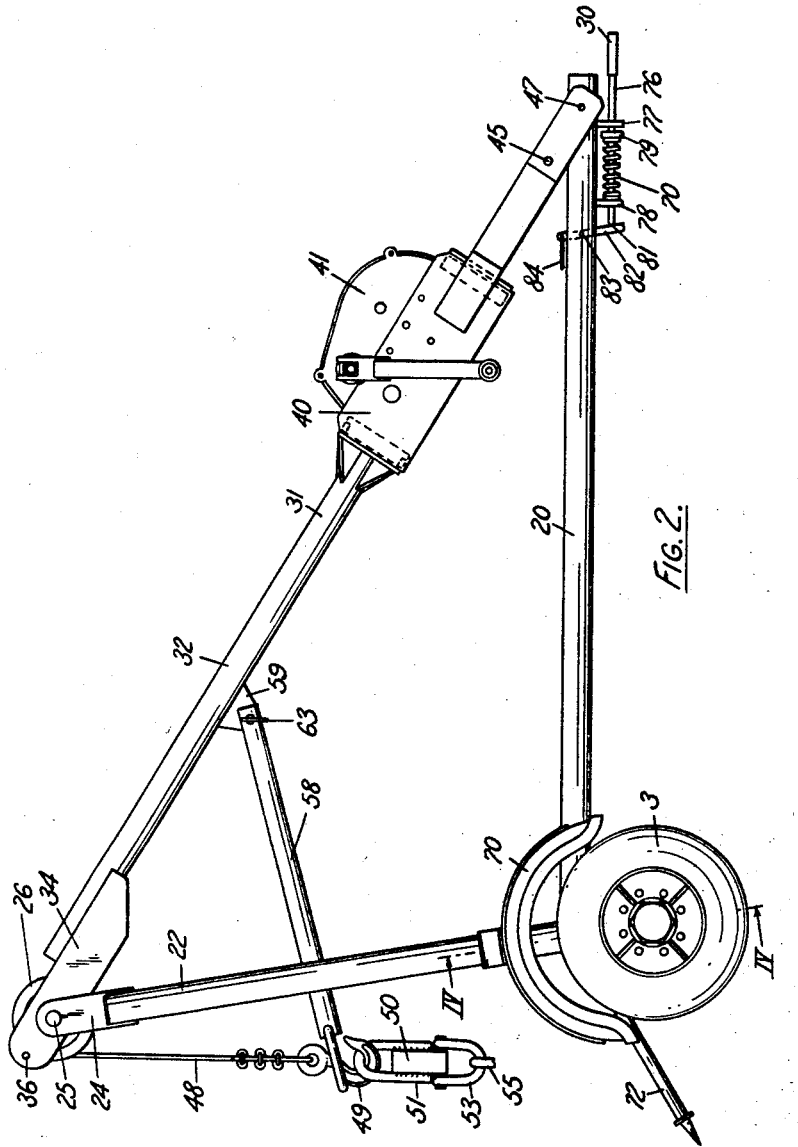

March 31, 1964     L. C. NEWMAN     3,127,037
APPARATUS FOR TOWING ROAD VEHICLES
Filed Dec. 13, 1961     3 Sheets-Sheet 3
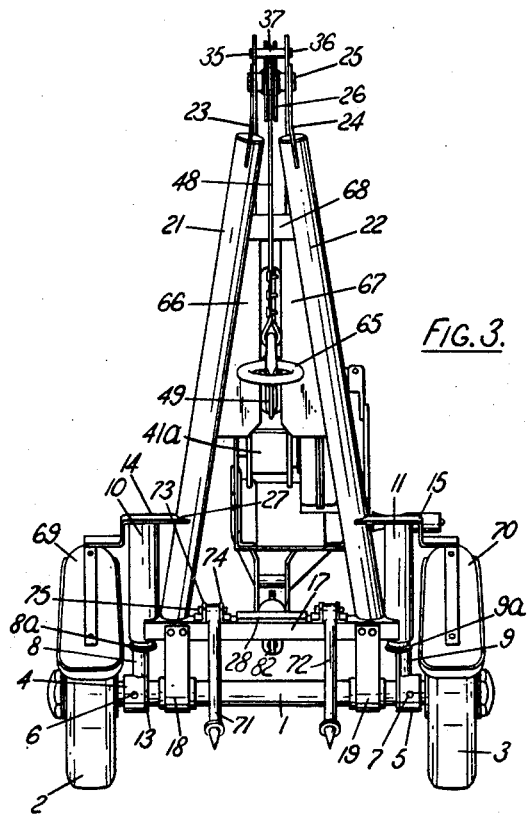
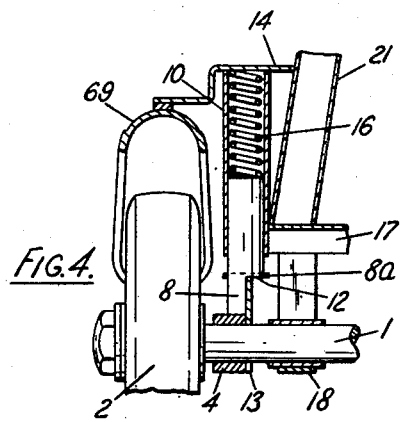
Inventor
Leslie C. Newman
By
Watson, Cole, Grindle & Watson
Attorneys

United States Patent Office 3,127,037
Patented Mar. 31, 1964

3,127,037
APPARATUS FOR TOWING ROAD VEHICLES
Leslie Cyril Newman, Bishop's Stortford, England, assignor to J. Brockhouse & Company Limited, West Bromwich, England, a British company
Filed Dec. 13, 1961, Ser. No. 158,978
Claims priority, application Great Britain June 6, 1961
11 Claims. (Cl. 214—86)

This invention concerns a new or improved apparatus for use in towing road vehicles. The invention is particularly applicable to apparatus for use in salvaging immobilised, broken-down or damaged road vehicles (hereinafter referred to inclusively as "damaged" road vehicles) especially where the break-down or damage is such as to require the raising of an end of the vehicle to enable it to be towed.

In the past various methods of towing road vehicles and, in particular, of salvaging damaged road vehicles have been used, each method having its own advantages and disadvantages. For example, when using a crane mounted on the rear of a towing vehicle such as a lorry or truck, an excessive load is placed on the rear of the towing vehicle and consequently the steering of the towing vehicle becomes light. Moreover the use of such a towing vehicle having a crane mounted thereon necessitates maintaining a large, heavy and expensive vehicle which cannot be used for other purposes and which utilizes a large area of floor space when not in use.

An alternative method of towing a vehicle requires the use of an "ambulance," in the form of a wheeled chassis and tow bar, which is drawn behind the towing vehicle. When towing a vehicle by this method it is first necessary to use a crane or other lifting device to lift one end of the vehicle on to the ambulance prior to towing the ambulance and vehicle away.

The principal object of the invention is to provide apparatus for towing a road vehicle which will be more convenient in use than such apparatus employed hitherto.

It is a further object of the invention to provide apparatus, the use of which will enable the above-mentioned disadvantages to be eliminated or at least reduced.

According to one aspect of the invention there is provided apparatus for towing a road vehicle, comprising a framework supported on road wheels and adapted to be attached to and towed behind a towing vehicle, the said framework including a frame-member adapted to extend substantially horizontally rearwards from a towing vehicle to which the framework is attached and at least two other frame-members converging upwardly away from positions spaced apart along the length of the first said frame-member, the apparatus further comprising a pulley supported by the said other frame-members at a position spaced above the first said frame-member, a flexible lifting member passing over the said pulley and depending therefrom, attachment means on the dependent portion of the said lifting member for attaching the lifting member to a vehicle to be towed and lifting means operable on the lifting member to raise the vehicle to be towed.

Preferably one of the said other frame-members extends upwardly and rearwardly relatively to the first said frame-member, so as to support the pulley at a position spaced rearwardly from the rearward end of the said first frame-member, and the apparatus may include a further frame-member extending upwardly and rearwardly relatively to the first said frame-member, symmetrically relatively to the said one other frame-member, these two members having their lower ends spaced apart on opposite sides of the first said frame-member and converging symmetrically upwards.

According to another aspect of the invention there is provided apparatus for towing a road vehicle and adapted to be attached to and towed behind a towing vehicle, such apparatus comprising a transverse chassis-member supported on road wheels, a towing member connected at its rear end to said chassis-member and extending forwardly therefrom and, when the apparatus is in use, disposed substantially horizontally for connection to a towing eye or the like at the rear of the towing vehicle, a strut extending upwardly from said chassis-member, a stay extending from the upper end of said strut forwardly and downwardly to the front end portion of said towing member to which the forward end of the stay is attached, a pulley at or near the junction of the upper end portions of said stay and strut, a flexible lifting member passing over said pulley and depending from the latter, attachment means on the said lifting member for attaching the lifting member to a vehicle to be towed and lifting means operable on said lifting member to raise the said vehicle.

In this case it will be desirable for the said strut to be constituted by two members having their lower ends mounted at spaced positions on the chassis-member, the said two members converging upwardly towards the junction with the stay.

According to yet another aspect of the invention, there is provided apparatus for towing a road vehicle, comprising a framework supported on road wheels and adapted to be attached to and towed behind a towing vehicle, a pulley supported by the framework in position to be spaced rearwardly and upwardly from the road wheels when the apparatus is in use, a flexible lifting member passing over the said pulley and depending therefrom, attachment means on the dependent portion of the said lifting member for attaching the lifting member to a vehicle to be towed, lifting means operable on the lifting member to raise the vehicle to be towed, a bar extending rearwardly of the framework and mounted thereon for pivoting movement about an axis extending transversely of the towing direction, means carried by the framework to limit movement of the bar transversely of the towing direction and means on the bar to engage the attachment means transversely of the towing direction while allowing the attachment means to pivot about an axis coincident with the dependent portion of the lifting member.

The flexible lifting member referred to above may be a rope, cable, chain or the like while the lifting means operable thereon preferably comprises a hand or power-operated winch. However, any other suitable lifting device may be employed, such as a hydraulic ram, or screw and nut means.

The invention will now be described more fully with reference to the accompanying drawings which show, by way of example only, one particular form of apparatus constructed in accordance therewith, for use in salvaging damaged vehicles. In the drawings:

FIGURE 1 is a perspective view of the said apparatus;
FIGURE 2 is a side elevational view;
FIGURE 3 is a rear elevational view, a part of the apparatus being omitted for the sake of clarity; and
FIGURE 4 is a fragmentary sectional view on the line IV—IV in FIGURE 2.

Referring to the drawings, the apparatus comprises an axle 1 extending transversely of the apparatus and carrying freely rotatable road wheels 2 and 3 at the ends thereof. Near the inner side of each of the said road wheels 2 and 3 there is mounted, upon the said axle 1, a short sleeve 4 or 5 secured to the axle by a set screw 6 or 7 and carrying an upstanding cylindrical post 8 or 9 which is vertical as seen from the rear of the apparatus. On each such post 8 or 9 is slidably or telescopically mounted a coaxial cylindrical tube 10 or 11.

At its lower end each post 8 or 9 is cut away, as shown most clearly at 12 in FIG. 4 in the case of the post 8, so as to facilitate the post being secured to the corresponding sleeve 6 by means of a plate 13. The plate 13 is apertured so that it can be engaged, jointly with the sleeve 6, on the axle 1.

The upper ends of the tubes 10 and 11 are closed by metal plates 14 and 15 and, referring particularly to FIG. 4, a coiled compression spring 16 is arranged within the tube 10 between the inner side of the closure plate 14 and the upper end of the post 8 on which the said tube 10 is axially slidable.

The lower ends of the slidable tubes 10 and 11, at opposite ends of the axle 1, are rigidly connected together by a transverse yoke-member or chassis-member 17 of inverted channel-shaped cross-section, which is welded at its ends to the tubes 10 and 11.

Because of the telescopic spring-biassed nature of the co-operating posts 8 and 9 and tubes 10 and 11, the transverse member 17 is supported resiliently on the axle 1, and thus each wheel is resiliently mounted by means of the corresponding pair of mounting members (post and tube) 8, 10 or 9, 11. Downward movement of the tubes 10 and 11 relatively to the posts 8 and 9 is limited by flanges or collars 8a and 9a formed on the said posts and when the apparatus is under load, that is to say, when it is in use for towing a vehicle, the tubes 10 and 11 will usually bear on the collars 8a and 9a. However, when the apparatus is being towed light, the tubes 10 and 11 will be resiliently movable relatively to the posts 8 and 9. In order to limit the upward separation of the member 17 from the axle 1 under the action of the springs such as 16, the member 17 is furnished near each end with a dependent loop 18 or 19 extending downwardly and around the axle 1, these loops each being formed by a metal strap of U-shape embracing the axle 1 and having its upper ends welded to the front and rear surfaces respectively of the transverse yoke or chassis 17.

The yoke or chassis 17 serves to support a framework consisting of a number of frame-members. These frame-members include a tubular frame-member 20 extending forwardly from the yoke or chassis 17 and two tubular members 21 and 22 extending upwardly from the yoke or chassis 17. Each member 21 or 22 has its lower end welded to the said member 17 near one end of the latter, the lower ends of the members 21 and 22 thus being spaced apart on either side of the member 20. As seen from the rear of the apparatus, these frame-members 21 and 22 converge symmetrically towards one another in an upward direction and they may be regarded as constituting a single upwardly and rearwardly extending strut. Each member 21 or 22 has a metal plate 23 or 24 secured at its upper end. The plates 23 and 24 are bent so that their upper parts are parallel, the parallel upper parts serving to support a removable horizontal bolt 25 which acts also as a spindle for a pulley 26.

The plates 14 and 15 carried by the respective spring-biased tubular members 10 and 11 are arcuately shaped at their inner ends, as indicated at 27 in the case of the plate 14, so as to engage with and locate the corresponding frame-member 21 or 22.

The frame-member 20 is welded at its rear end to a bracket plate 28 and this is detachably secured by nuts and bolts to the yoke or chassis 17 so that the member 20 projects forwardly from the yoke or chassis 17 at right angle thereto. Thus, when the apparatus is in use, the member 20 extends substantially horizontally forwards from the yoke or chassis 17. At its front end the member 20 carries a towing eye 30 for attachment to a lorry or other towing vehicle, the member 20 thus constituting a towing bar.

The frame-member or towing bar 20 makes an included angle rather greater than 90° with the transverse plane containing the members 21 and 22 so that, when the apparatus is in use and the bar 20 is substantially horizontal or only very slightly inclined upwardly and forwardly, the members 21 and 22 are inclined upwardly and rearwardly (as seen most clearly in FIG. 2) at a small angle of, say, about 15° to the vertical. Thus the pulley spindle 26 at the upper end of the members 21 and 22 only slightly overhangs rearwardly the road wheel axle 1 of the apparatus.

The towing eye 30 is mounted on the member 20 by means of its shank 76 which is longitudinally slidable in apertures formed in brackets 77 and 78 carried by the member 20. The shank 76 has a thrust collar 79 rigidly mounted thereon and a coil spring 80 works between the bracket 78 and the collar 79. The shank 76 bears at 81 against a lever 82 which is itself pivotally mounted at 83 in a slot in the member 20. The lever 82 is connected by means of Bowden or like cable 84 to brakes (not shown) fitted to the wheels 2 and 3.

When a towing force is applied by a towing vehicle to the eye 30, forward sliding movement of the shank 76 relatively to the brackets 77 and 78 is limited by the engagement of the collar 79 with the bracket 77. However, when the towing vehicle brakes, the apparatus of the invention tends to over-ride, that is to say, the member 20 tends to move forwardly relatively to the towing eye 30, thus compressing the spring 80 between the bracket 78 and the collar 79. The result is that the lever 82 pivots in the clockwise direction as viewed in FIG. 2, thus applying the brakes of the road wheels 2 and 3 by means of the cable 84. When the tendency of the apparatus of the invention to over-ride is corrected, the eye 30 again tends to move forwardly relatively to the member 20, so that the brakes are released.

A stay 31 is provided between the upper ends of the strut tubes 21 and 22 and the front end of the towing bar 20. The stay 31 is of a composite construction. The main portion of the upper rear part of the stay comprises a metal tube 32 to the upper end of which are welded, one on each side of the tube, a pair of parallel metal plates 33, 34 located in vertical planes and extending upwardly and rearwardly from the upper end of the said tube.

At their upper extremities, the said two plates 33 and 34 are secured together by a nut 35 and bolt 36 and are spaced apart by a distance tube 37 mounted on the bolt 36. The plates 33 and 34 are furnished with registering apertures through which passes the previously mentioned bolt 25. Thus in addition to serving as a spindle for the pulley 26, the bolt 25 also serves to secure together the upper ends of the frame-members 21 and 22 and the plates 33 and 34 carried by the stay 31. The plates 33 and 34 are themselves located between the plates 23 and 24.

The front lower end of the stay tube 32 is rigidly secured to an oblong box structure 40 formed of metal plates and angle irons welded together, which structure is open at two of its longer faces and houses a hand-operated winch 41. The strut tube 32 is secured to the structure 40 with the aid of gusset plates 42 welded to the tube 32 and to the structure 40.

A pair of side straps 43, 44 are welded at their rear ends, one to each side of the box structure 40, and extend forwardly therefrom before converging towards the position at which they are connected together by a bolt 45 carrying a distance piece 46. Forwardly of the bolt 45 the straps 43 and 44 run parallel to one another and are connected to the forward end of the bar 20 at the opposite sides thereof by means of a bolt 47, so as to be disconnectable therefrom as and when desired.

The tube 32 and the towing bar 20 lie in the vertical longitudinal medial plane of the apparatus and a cable 48 extends from the drum 41a of the winch 41 and passes upwardly through the tube 32 and then over the pulley 26, the cable 48 depending vertically from the said pulley 26 behind the members 21 and 22 but with only a relatively slight overhang due to the relatively small rearward and upward inclination of the members 21 and 22.

At its lower end the dependent portion of the cable 48 carries a hook 49 on which is mounted a sling bar or attachment beam 50 having an eye-member 51 at the centre thereof for engagement with the hook 49. The beam 50 carries a shackle 52 or 53 near each of its ends, each shackle 52 or 53 carrying a chain 54 or 55 which serves as securing means for securing the beam 50 to a vehicle to be towed. For this purpose each chain 54 or 55 is provided with a hook 56 or 57 at the lower end thereof, the hooks 56 and 57 being shaped for engagement with any convenient link of the corresponding chain 54 or 55 so that the chains 54 and 55 can be secured to a convenient part of the vehicle to be towed. The beam 50 holds the vehicle suspended for towing and permits a swivelling action of the load relatively to the wheels 2 and 3 of the salvaging apparatus. The lifting cable 48 acts as a pivot to allow such swivelling, while any side sway or overriding of the vehicle being towed is restrained by an anti-sway bar 58 which is located in the longitudinal medial plane of the apparatus. For this purpose the forward end of the bar 58 is bifurcated and the strut 32 carries a lug 59 which engages between the bifurcations of the bar 58. The bar 58 is secured to the lug 59 by means of a pin 60 engaged through registering apertures in the bifurcations of the bar 58 and in the lug 59. The pin 60 is formed with an annular flange 61 and a coil spring 62 is mounted on the pin 60 between the flange 61 and the surface of the bar 58. The end of the pin 60 is bifurcated to receive a latching member 63 pivotally mounted thereon. The spring 62 serves to maintain the pin 60 in a position in which the latching member 63 extends transversely of the pin 60 and prevents withdrawal of the latter from the registering apertures in the bar 58 and lug 59. However, the latching member 63 can be pivoted, against the action of the spring 62, into the position in which it extends co-axially with the pin 60. The pin 60 can then be withdrawn, a ring 64 being provided to facilitate this.

The bar 58 extends rearwardly between and beyond the two upwardly convergent members 21 and 22 and is provided, at its rear end, with a ring 65. The hook 49 and eye 51 are engaged through the ring 65, so that the latter rests on the beam 50.

To confine the pivoting movement of the bar 58 to movement in the vertical medial plane of the apparatus, each of the members 21 and 22 is provided along the upper portion thereof with an inwardly directed radial guide plate 66 or 67 welded thereto, the bar 58 being free to slide in the vertical direction between these guide plates. A bridge piece 68 extends between the members 21 and 22, above the guide plates 66 and 67.

Because of the small overhang of the lifting cable 48 behind the axle 1, only a very light upward thrust is exerted by the towing ring 30 upon the rear of the towing vehicle and therefore only a very small load is required on the latter to compensate for this upward thrust. Thus there is no heavy extra load applied to the rear axle of the towing vehicle and no interference with the steering of the towing vehicle is experienced.

The salvaging apparatus is furnished with anti-splash guards 69 and 70 over its wheels, these anti-splash guards being secured to the plates 14 and 15 and preferably being made of a resilient material, such as rubber or rubber composition, or a thermoplastic material.

The yoke or chassis 17 also carries sprag-ended rods 71 and 72 which are mounted thereon by means of pins engaging with lugs carried by the member 17. Thus the rod 71 is detachably engaged with lugs 73 and 74 by means of a pin 75 and when so engaged the rod 71 is pivotable about the pin 75. Thus the rods 71 and 72 may be pivoted into positions in which their sprag ends can be engaged in the ground so as to restrain the apparatus against movement when a salvaged vehicle is being drawn towards the apparatus by the winch 41 preparatory to being towed away. During towing the rods 71 and 72 are removed and stowed away. As an alternative, the sprag-ended rods could be pivotally mounted on the pulley spindle 25. In this case they would have to be considerably longer than those shown in the drawings, so as to extend downwardly to ground level.

It will be appreciated that the towing bar 20 and the strut 31, together with the lifting means carried by the latter, can readily be disconnected from one another and from the assembly consisting of the wheeled chassis 17 and the members 21 and 22. Moreover, the anti-sway bar 58 can also be detached from the stay 31, so that the whole apparatus can be stowed in a small space when desired.

It will also be readily understood that the towing apparatus according to this invention combines the advantages of both a towing ambulance and a crane without having the disadvantages of either of these items.

I claim:

1. Apparatus for towing a road vehicle, comprising a frame work supported on road wheels and adapted to be attached to and towed behind a towing vehicle, a pulley supported by the framework in position to be spaced rearwardly and upwardly from the road wheels when the apparatus is in use, a flexible lifting member passing over the said pulley and depending therefrom, attachment means on the dependent portion of the said lifting member for attaching the lifting member to a vehicle to be towed, lifting means operable on the lifting member to raise the vehicle to be towed, a bar extending rearwardly of the framework and mounted thereon for pivoting movement about an axis extending transversely of the towing direction, means carried by the framework to limit movement of the bar transversely of the towing direction and means on the bar to engage the attachment means and thus to prevent movement of the attachment means transversely of the towing direction while allowing the attachment means to pivot about an axis coincident with the dependent portion of the lifting member.

2. Apparatus according to claim 1, wherein the framework includes two frame-members extending symmetrically upwardly and rearwardly relatively to the road wheels, to support the pulley, the bar extending rearwardly between to the two said symmetrical frame-members and the means to limit transverse movement of the bar comprising guide members carried by the symmetrical frame-members and co-operating to prevent substantially all movement of the bar transversely of the towing direction.

3. Apparatus according to claim 1, wherein the road wheels are resiliently mounted.

4. Apparatus according to claim 1 including, for each road wheel, a pair of telescopically slidable mounting members secured respectively to the wheel and to the framework, the mounting members of each said pair being spring-biassed outwardly relatively to one another so as to provide a resilient mounting for the corresponding road wheel.

5. Apparatus according to claim 1, wherein the attachment means include a beam extending transversely of the towing direction and securing means spaced apart along the beam for securing the beam to a vehicle to be towed.

6. Apparatus according to claim 5, wherein the attachment means include a co-operating hook and eye by means of which the attachment beam is connected to the flexible lifting member.

7. Apparatus according to claim 5, wherein the attachment means include a co-operating hook and eye by means of which the attachment beam is connected to the flexible lifting member, the means carried by the said bar for engagement with the attachment means comprising a ring and the said hook and eye being engaged through such ring.

8. Apparatus according to claim 1, including, for each road wheel, a pair of telescopically slidable mounting members secured respectively to the wheel and to the framework, the mounting members of each said pair being spring-biased outwardly relatively to one another so as the provide a resilient mounting for the corresponding road wheel, and including stop means to limit relative inward movement of each two mounting members.

9. Apparatus according to claim 1, including, for each road wheel, a pair of telescopically slidable mounting members secured respectively to the wheel and to the framework, the mounting members of each said pair being spring-biased outwardly relatively to one another so as to provide a resilient mounting for the corresponding road wheel, and wherein the road wheels are mounted on a common axle, means being provided to limit movement of said axle relatively to said framework during relative outward movement of the mounting members of each said pair.

10. Apparatus according to claim 1, wherein the attachment means include a beam extending transversely of the towing direction and securing means spaced apart along the beam for securing the beam to a vehicle to be towed, and wherein the attachment means include a co-operating hook and eye by means of which the attachment beam is connected to the flexible lifting member.

11. Apparatus according to claim 1, wherein the attachment means include a beam extending transversely of the towing direction and securing means spaced apart along the beam for securing the beam to a vehicle to be towed, and wherein the attachment means include a co-operating hook and eye by means of which the attachment beam is connected to the flexible lifting member, the means carried by the said bar for engagement with the attachment means comprising a ring and the said hook and eye being engaged through such ring.

References Cited in the file of this patent

UNITED STATES PATENTS

| | | |
|---|---|---|
| 2,553,229 | Barhorst | May 15, 1951 |
| 2,808,160 | La Londe | Oct. 1, 1957 |
| 2,937,772 | Sullivan | May 24, 1960 |

FOREIGN PATENTS

| | | |
|---|---|---|
| 509,829 | Italy | Oct. 29, 1952 |